US008862779B2

(12) United States Patent
Borger et al.

(10) Patent No.: US 8,862,779 B2
(45) Date of Patent: Oct. 14, 2014

(54) SYSTEMS, METHODS AND COMPUTER PROGRAM PRODUCTS FOR INTEGRATING ADVERTISING WITHIN WEB CONTENT

(75) Inventors: Dana Borger, Cary, NC (US); Steve Cox, Durham, NC (US); Tom Gordon, New York, NY (US); David Spitz, Raleigh, NC (US); Matthew Squire, Raleigh, NC (US); Jay Thrash, Cary, NC (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 12/688,548

(22) Filed: Jan. 15, 2010

(65) Prior Publication Data

US 2010/0185512 A1    Jul. 22, 2010

Related U.S. Application Data

(63) Continuation of application No. 09/922,348, filed on Aug. 3, 2001, now Pat. No. 7,653,748.

(60) Provisional application No. 60/224,152, filed on Aug. 10, 2000.

(51) Int. Cl.
*G06F 15/16* (2006.01)
*G06Q 30/00* (2012.01)
(Continued)

(52) U.S. Cl.
CPC ..... *H04L 65/602* (2013.01); *H04M 2203/2083* (2013.01); *G06Q 30/0251* (2013.01);
(Continued)

(58) Field of Classification Search
CPC ........ G06F 3/167; G06F 17/30861–17/30887; H04L 67/02; G06Q 3/0241–3/0277; H04M 3/493; H04M 3/4936; H04M 3/4938

USPC ........... 705/14.4, 14.72, 14.73, 14.49–14.67; 709/201–207, 217–219, 246
See application file for complete search history.

(56) References Cited

U.S. PATENT DOCUMENTS 5,732,216 A * 3/1998 Logan et al. ................. 709/203
5,832,432 A * 11/1998 Trader et al. ................. 704/260
(Continued)

*Primary Examiner* — Patrice Winder
*Assistant Examiner* — Julian Chang
(74) *Attorney, Agent, or Firm* — Kutak Rock LLP; Sean P. Connolly

(57) ABSTRACT

Systems, methods, and computer program products that facilitate the integration and accounting of advertising within audio Web content requested by users via telephone devices are provided. Upon receiving a request from a user for Web content via a telephone device, a Web server retrieves an advertisement from an advertisement server, inserts the retrieved advertisement within the user requested Web content, and forwards the user requested Web content and advertisement to a text-to-speech transcoder for conversion to an audio format. The text-to-speech transcoder converts the Web content and advertisement from a text-based format to an audio format and serves the Web content and advertisement in the audio format to the user client device via a telephone link established with the user client device. If an advertisement is interactive, a text-to-speech transcoder may be configured to notify an advertisement server of user interaction with the advertisement. Information such as an identification of a requesting client device, user, as well as time and date information, may be recorded by an advertisement server for use in measuring effectiveness of a particular marketing and/or advertising campaign. Information associated with providing a user with additional information associated with an advertisement may also be stored.

8 Claims, 4 Drawing Sheets

(51) Int. Cl.
*G06Q 30/02* (2012.01)
*H04L 29/08* (2006.01)
*H04M 3/493* (2006.01)
*H04L 29/06* (2006.01)
*G06F 17/30* (2006.01)
*H04M 3/487* (2006.01)
*G06F 3/16* (2006.01)

(52) U.S. Cl.
CPC ........... *H04L 67/02* (2013.01); *G06Q 30/0257* (2013.01); *H04M 3/4938* (2013.01); *G06F 17/30861* (2013.01); *H04L 67/20* (2013.01); *H04M 2201/60* (2013.01); *H04L 29/06027* (2013.01); *H04M 3/4878* (2013.01); *G06F 3/167* (2013.01); *G06Q 30/02* (2013.01); *G06Q 30/0277* (2013.01); *H04L 29/06* (2013.01)
USPC ......... 709/246; 709/203; 709/219; 705/14.49

(56) References Cited

U.S. PATENT DOCUMENTS

| | | | | |
|---|---|---|---|---|
| 5,937,162 A * | 8/1999 | Funk et al. | ............ | 709/206 |
| 6,199,076 B1 * | 3/2001 | Logan et al. | ............ | 715/203 |
| 6,526,335 B1 * | 2/2003 | Treyz et al. | ............ | 701/1 |
| 6,587,547 B1 * | 7/2003 | Zirngibl et al. | ............ | 379/88.17 |
| 6,636,831 B1 * | 10/2003 | Profit et al. | ............ | 704/275 |
| 6,662,163 B1 * | 12/2003 | Albayrak et al. | ............ | 704/275 |
| 6,698,020 B1 * | 2/2004 | Zigmond et al. | ............ | 725/34 |
| 6,711,474 B1 * | 3/2004 | Treyz et al. | ............ | 701/1 |
| 6,836,792 B1 * | 12/2004 | Chen | ............ | 709/220 |
| 6,859,776 B1 * | 2/2005 | Cohen et al. | ............ | 704/270 |
| 6,874,018 B2 * | 3/2005 | Wu | ............ | 709/219 |
| 6,970,915 B1 * | 11/2005 | Partovi et al. | ............ | 709/217 |
| 7,095,733 B1 * | 8/2006 | Yarlagadda et al. | ............ | 370/352 |
| 7,454,346 B1 * | 11/2008 | Dodrill et al. | ............ | 704/260 |
| 7,490,053 B1 * | 2/2009 | Emerson et al. | ............ | 705/14.61 |
| 7,509,178 B2 * | 3/2009 | Logan et al. | ............ | 700/94 |
| 7,546,527 B2 * | 6/2009 | Dames et al. | ............ | 715/239 |
| 7,663,652 B1 * | 2/2010 | Reese | ............ | 715/744 |
| 7,788,100 B2 * | 8/2010 | Slotznick et al. | ............ | 704/270.1 |
| 8,082,355 B1 * | 12/2011 | Weber et al. | ............ | 709/231 |
| 8,117,068 B2 * | 2/2012 | Shuster et al. | ............ | 705/14.53 |
| 8,146,001 B1 * | 3/2012 | Reese | ............ | 715/752 |
| RE44,477 E * | 9/2013 | Emerson et al. | ............ | 705/14.61 |
| 2001/0033564 A1 * | 10/2001 | Hickman | ............ | 370/352 |
| 2001/0040886 A1 * | 11/2001 | Jimenez et al. | ............ | 370/352 |
| 2001/0042100 A1 * | 11/2001 | Guedalia et al. | ............ | 709/206 |
| 2001/0048676 A1 * | 12/2001 | Jimenez et al. | ............ | 370/352 |
| 2002/0003547 A1 * | 1/2002 | Wang et al. | ............ | 345/727 |
| 2002/0006124 A1 * | 1/2002 | Jimenez et al. | ............ | 370/352 |
| 2002/0010794 A1 * | 1/2002 | Stanbach, Jr. et al. | ............ | 709/245 |
| 2002/0052747 A1 * | 5/2002 | Sarukkai | ............ | 704/270 |
| 2002/0062393 A1 * | 5/2002 | Borger et al. | ............ | 709/246 |
| 2002/0072915 A1 * | 6/2002 | Bower | ............ | 704/270.1 |
| 2002/0091570 A1 * | 7/2002 | Sakagawa | ............ | 705/14 |
| 2002/0093944 A1 * | 7/2002 | Shen et al. | ............ | 370/352 |
| 2002/0095330 A1 * | 7/2002 | Berkowitz et al. | ............ | 705/14 |
| 2002/0095473 A1 * | 7/2002 | Berkowitz et al. | ............ | 709/217 |
| 2002/0123334 A1 * | 9/2002 | Borger et al. | ............ | 455/419 |
| 2002/0129067 A1 * | 9/2002 | Dames et al. | ............ | 707/523 |
| 2002/0164000 A1 * | 11/2002 | Cohen et al. | ............ | 379/88.17 |
| 2002/0178007 A1 * | 11/2002 | Slotznick et al. | ............ | 704/270.1 |
| 2002/0193983 A1 * | 12/2002 | Tokieda et al. | ............ | 704/2 |
| 2003/0023631 A1 * | 1/2003 | Castle | ............ | 707/513 |
| 2003/0142958 A1 * | 7/2003 | Matsunaga et al. | ............ | 386/93 |
| 2003/0212759 A1 * | 11/2003 | Wu | ............ | 709/218 |
| 2005/0111439 A1 * | 5/2005 | Yarlagadda et al. | ............ | 370/352 |
| 2007/0050478 A1 * | 3/2007 | Hickman et al. | ............ | 709/219 |
| 2007/0116206 A1 * | 5/2007 | Shen et al. | ............ | 379/88.17 |
| 2007/0206737 A1 * | 9/2007 | Hickman | ............ | 379/93.02 |
| 2009/0030774 A1 * | 1/2009 | Rothschild et al. | ............ | 705/10 |
| 2010/0185512 A1 * | 7/2010 | Borger et al. | ............ | 705/14.49 |
| 2011/0029876 A1 * | 2/2011 | Slotznick et al. | ............ | 715/727 |
| 2012/0029987 A1 * | 2/2012 | Kusumoto et al. | ............ | 705/14.16 |
| 2013/0059607 A1 * | 3/2013 | Herz et al. | ............ | 455/456.3 |

* cited by examiner

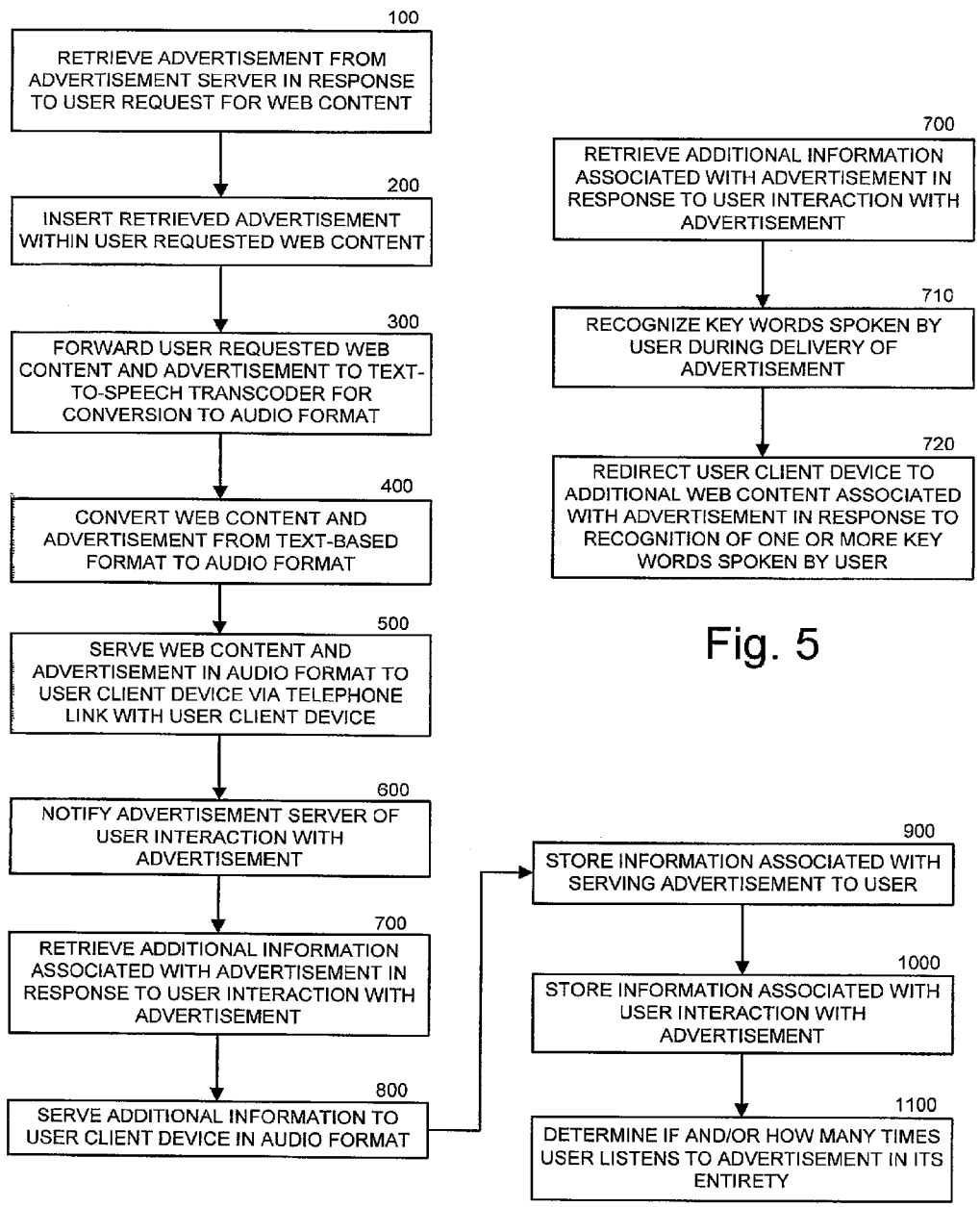

SYSTEMS, METHODS AND COMPUTER PROGRAM PRODUCTS FOR INTEGRATING ADVERTISING WITHIN WEB CONTENT

CROSS-REFERENCED TO RELATED APPLICATIONS

This application is a Continuation of U.S. patent application Ser. No. 09/922,348 filed on Aug. 3, 2001, now U.S. Pat. No. 7,653,748 which claims priority to U.S. Provisional Patent Application No. 60/224,152 filed Aug. 10, 2000. All of the above applications are incorporated herein by reference in their entirety.

FIELD OF THE INVENTION

The present invention relates generally to communications networks and, more particularly, to advertising via communications networks.

BACKGROUND OF THE INVENTION

The Internet has gained broad recognition and acceptance as a viable medium for communicating and for conducting business. The World-Wide Web (Web) is comprised of server-hosting computers (Web servers) connected to the Internet that have hypertext documents (referred to as Web pages) stored therewithin. Web pages are accessible by client program (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols and Web content formats.

With the increasing mobility of today's society, the demand for mobile computing capabilities has also increased. Many workers and professionals are downsizing their laptop computers to smaller hand-held devices, such as personal digital assistants (PDAs). In addition, many people now utilize wireless devices, such as cellular telephones, to access the Internet and to perform various other computing functions. Wireless devices may include, but are not limited to, PDAs, cellular telephones, pagers, and communicators. Many wireless devices also utilize the Microsoft® Windows® CE and 3Com Palm® Computing platforms. With the advent and development of wireless telecommunications systems and technologies, wireless Internet access is increasing worldwide.

As the Web has evolved into a viable commercial medium, advertising has become an important source of revenue for many entities. Web pages served from Web sites may utilize advertising to promote various goods and services. For many conventional wireless devices, Web content is displayed as a sequence of displays (cards). To subsidize costs, wireless content publishers may use advertisements mixed with content, often as interstitial displays within a sequence of content displays.

Conventionally, advertisements are served from an advertisement server, as illustrated in prior art FIG. 1. A browser executing within a client device 10 requests an advertisement from an advertisement server 20, represented by A. The advertisement server 20 returns the advertisement to the client device for insertion within a displayed Web page, represented by B. When a user clicks on the displayed advertisement, a request is sent to the advertisement server 20, represented by C. In response, the advertisement server 20 returns a redirection directive associated with a third party advertiser to the browser, represented by D. The browser follows the redirection to a Web site of the advertiser 25, represented by E, wherein additional details and/or information can be obtained, represented by F.

One of the primary functions of an advertisement server is to store (and allow retrieval of) information on the effectiveness of a given advertising campaign (referred to as "accounting"). The effectiveness of advertising via the Internet is conventionally measured by monitoring the "click-through" rate associated with advertising. A "click-through" event occurs when a user interacts with an advertisement displayed within a Web page by "clicking" on the advertisement (e.g., via a mouse or other input device) Conventionally, an advertisement server is notified when an advertisement is served, and when a user clicks on the advertisement. These advertisement servers typically maintain statistics on how many times advertisements have been served, how many times they have been "clicked-on", etc., even if advertisements are served from multiple sites in multiple domains.

"Voice portals", which allow access to the Internet via telephone, are becoming increasingly popular. Utilizing speaker-independent speech recognition and text-to-speech technologies, voice portals can be accessed via wireless and wireline telephones and can allow users to "verbally" surf the web and make transactions (e.g., purchase airline tickets). Voice Extensible Markup Language (VXML) allows a user to interact with the Internet through voice-recognition technology. Instead of a traditional browser that relies on a combination of HTML and keyboard and/or mouse, VXML relies on a voice browser and/or the telephone. Using VXML, a user interacts with a voice browser by listening to audio output that is either pre-recorded or computer-synthesized and then submitting audio input either by voice or by keypad.

As with the visually browsed Internet, voice portals are expected to generate revenue by selling advertising "space" on their sites. Advertising space for a voice portal relates to audio advertisements interspersed with content. Thus, when "listening to the Web", a user might hear advertisements similar to those conventionally heard via radio.

Unfortunately, delivery, management, and accounting for audio advertisements may be difficult via conventional advertisement server systems. In addition, audio advertisements may not be capable of interacting with conventional Internet advertising. As such, a need exists for integrating audio advertisements with conventional advertisement server systems and for allowing interaction with audio advertisements.

SUMMARY OF THE INVENTION

In view of the above, the present invention provides systems, methods, and computer program products that can facilitate the integration and accounting of advertising within audio Web content requested by users via telephone devices. Upon receiving a request from a user for Web content via a telephone device, a Web server retrieves an advertisement from an advertisement server, inserts the retrieved advertisement within the user requested Web content (i.e., within a VXML document(s) representative of the Web content), and forwards the user requested Web content and advertisement to a text-to-speech transcoder for conversion to an audio format. The text-to-speech transcoder converts the Web content and advertisement from a text-based format to an audio format and serves the Web content and advertisement in the audio format (i.e., as an audio stream) to the user client device via a telephone link established with the user client device.

According to embodiments of the present invention, if an advertisement is configured to be interactive, a text-to-speech transcoder may be configured to notify an advertisement server of user interaction with the advertisement. For example, user interaction with the advertisement (i.e., by pressing a key on a keypad during the advertisement and/or by speaking one or more recognizable words and/or phrases) is recorded by an advertisement server. Moreover, information such as, but not limited to, an identification of the requesting client device, user, and time and date information, may be recorded by an advertisement server for use in measuring effectiveness of a particular advertising campaign. Information associated with providing a user with additional information associated with an advertisement may also be stored.

According to embodiments of the present invention, a text-to-speech transcoder may be configured to retrieve additional information associated with an advertisement in response to user interaction therewith and deliver the additional information to a user client device in an audio format. For example, a text-to-speech trans coder may be configured to recognize key words spoken by the user during delivery of an advertisement. In response to recognizing one or more key words spoken by the user, a text-to-speech transcoder may be configured to redirect the user client device to additional Web content associated with the advertisement (e.g., to another Web site). According to embodiments of the present invention, additional information may be retrieved from (or via) an advertisement server and delivered to a user client device.

An advertisement server according to embodiments of the present invention may be configured to store information associated with serving an advertisement to a user, as well as information associated with user interaction with an advertisement.

According to additional embodiments of the present invention, an advertisement server may be configured to determine if and/or how many times a user listens to an advertisement.

BRIEF DESCRIPTION OF THE DRAWINGS

FIGS. 4-5 are flowcharts that illustrate operations for integrating interactive advertising within audio Web content according to embodiments of the present invention.

DETAILED DESCRIPTION OF THE INVENTION

Figure 1:
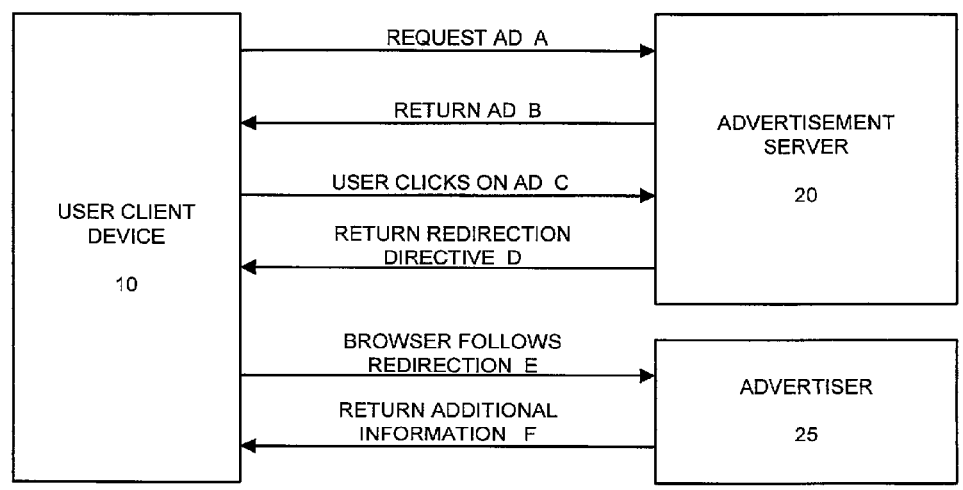
FIG. 1 is a block diagram that illustrates how advertisements are served from a conventional advertisement server.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As also will be appreciated by one of skill in the art, the present invention may be embodied as methods, data processing systems, and/or computer program products. Accordingly, the present invention may take the form of an entirely hardware embodiment, an entirely software embodiment running on general purpose hardware or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language (e.g., JAVA®, Smalltalk or C++) and/or may also be written in a conventional procedural programming language (e.g., "C"). However, software embodiments of the present invention do not depend on implementation with a particular programming language. Program code may execute entirely on one or more server computer systems.

The present invention is described below with reference to block diagram and flowchart illustrations of methods, apparatus (systems) and computer program products according to embodiments of the invention. It will be understood that each block of the block diagrams and/or flowchart illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create structures for implementing the functions specified in the block diagram and/or flowchart block or blocks. Each block, and combinations of blocks, can be implemented by servers which perform the specified functions or steps, or combinations of special purpose hardware and computer instructions.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

It should be noted that, in some alternative embodiments of the present invention, the functions noted in the blocks may occur out of the order noted in the figures. For example, two blocks shown in succession may in fact be executed substantially concurrently or the blocks may sometimes be executed in the reverse order, depending on the functionality involved. Furthermore, in certain embodiments of the present invention, such as object oriented programming embodiments, the sequential nature of the flowcharts may be replaced with an object model such that operations and/or functions may be performed in parallel or sequentially.

Figure 2:
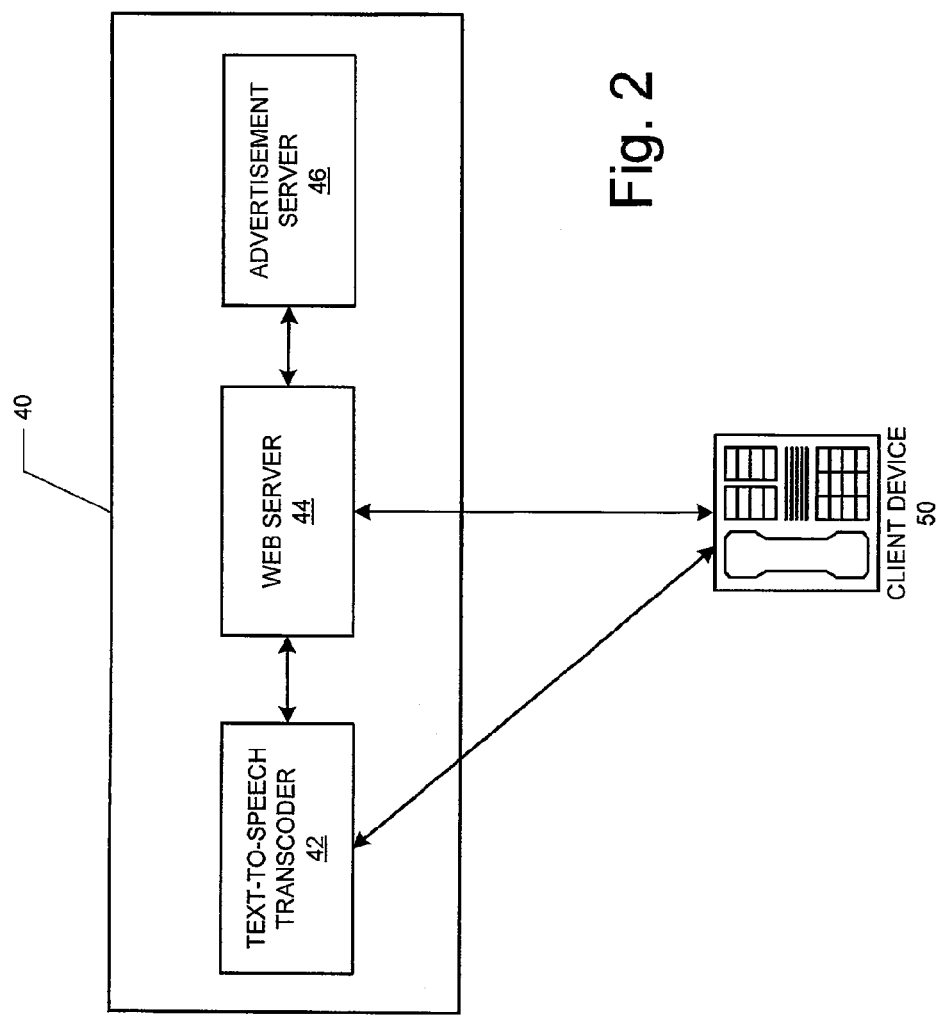
FIG. 2 is a block diagram that illustrates a computer system according to embodiments of the present invention that is configured to integrate interactive advertising within audio Web content requested by users.

Referring to FIG. 2, a computer system 40 configured to integrate interactive advertising within Web content requested by users via client devices 50 (e.g., wireline and/or wireless telephone devices), according to embodiments of the present invention, is illustrated. The illustrated computer system 40 includes a text-to-speech transcoder 42 that is configured to convert Web content (including advertisements) from a text-based format (e.g., VXML format) to an audio format, a Web server 44 that hosts Web content, and an advertisement server 46 that provides advertisements for insertion within Web content delivered in response to user requests. The text-to-speech transcoder 42, Web server 44, and advertisement server 46 may be implemented via a single data processing device or via multiple data processing devices. Moreover, the text-to-speech transcoder 42, Web server 44, and advertisement server 46 may be implemented via remotely located data processing devices.

Figure 3:
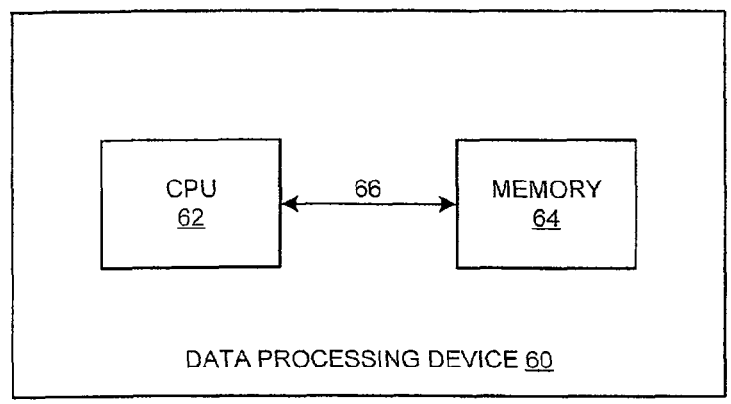
FIG. 3 is a block diagram that illustrates an exemplary data processing device upon which embodiments of the present invention may be implemented or practiced.

FIG. 3 is a block diagram that illustrates an exemplary data processing device 60 upon which embodiments of the present invention may be implemented or practiced. A separate data processing device 60 may be used to implement the text-to-speech transcoder 42, Web server 44, and advertisement server 46. Alternatively, two or more of the text-to-speech transcoder 42, Web server 44, and advertisement server 46 may be implemented via a single data processing device 60.

The illustrated data processing device 60 includes a central processor (CPU) 62 and memory 64. The memory 64 is configured to store computer program instructions to be executed by the CPU 62 for performing the process steps represented by the block diagrams and flow charts of FIG. 2 and FIGS. 4-5. The CPU 62 communicates with the memory 64 via an address/data bus 66.

The CPU 62 may be, for example, a commercially available or custom microprocessor. The memory 64 is representative of the overall hierarchy of memory devices containing software and data used to facilitate and account for call-through advertising between third party advertisers and users of Web-enabled telephone devices in accordance with embodiments of the present invention. The memory 64 may store other information and software such as applications programs, network communication programs (e.g., TCP/IP protocol), operating system software, server software, such as HTTP server software/etc. The memory 64 may include, but is not limited to, the following types of devices: cache, ROM, PROM/EPROM, EEPROM, flash, SRAM, and DRAM.

Referring back to FIG. 2, the Web server 44 hosts Web content in a text-based format, such as VXML. The Web server 44 is configured to retrieve (i.e., request) an advertisement from the advertisement server 46 and insert the retrieved advertisement within user requested Web content. The Web server 44 is also configured to forward the user requested Web content and advertisement to the text-to-speech transcoder 42 for conversion to an audio format and subsequent delivery to a user client device 50 as an audio stream.

The text-to-speech transcoder 42 is configured to convert Web content, and advertisements inserted therewithin, from a text-based format, such as VXML, to an audio format. The text-to-speech transcoder 42 is configured to serve the transcoded Web content (including advertisements) in an audio format to a user client device 50 (e.g., a telephone) via a telephone link with the user client device 50. For advertisements that are configured to be interactive, the text-to-speech transcoder 42 may be configured to notify the advertisement server 46 of user interaction therewith.

According to embodiments of the present invention, the text-to-speech transcoder 42 is configured to retrieve additional information associated with an advertisement in response to user interaction with the advertisement, and to deliver the additional information to the user client device 50 in an audio format.

Additional information associated with an advertisement may be retrieved from the advertisement server 46 or from another source. According to embodiments of the present invention, the text-to-speech transcoder 42 is configured to recognize one or more key words spoken by a user during delivery of an advertisement to the user's client device 50. The text-to-speech transcoder 42 is configured to redirect the user client device to additional audio content associated with the advertisement in response to recognition of one or more key words spoken by the user.

According to embodiments of the present invention, the advertisement server 46 is configured to select advertisements for insertion within user-requested Web content based upon the requested Web content, and/or based upon information associated with the requesting user. In addition, the advertisement server 46 may be configured to select advertisements for insertion within user-requested Web content having a format and size (e.g., a predetermined time length) compatible with user-requested Web content when the Web content is converted to an audio format. For example, user-requested Web content may be configured to include an advertisement having a length of thirty (30) seconds when converted to audio format. Accordingly, the advertisement server 46 selects one or more advertisements that collectively do not exceed the thirty (30) second parameter.

According to embodiments of the present invention, the advertisement server 46 may be configured to store information associated with user interaction with an advertisement. In addition, the advertisement server 46 may be configured to determine if a user listened to an advertisement in its entirety and/or determine how many times a user listens to an advertisement.

Users receiving advertising and Web content in audio format in accordance with embodiments of the present invention may communicate with the Web server 44 and text-to-speech transcoder 42 via any type of wireline and wireless telephone device. Exemplary telephone devices include, but are not limited to, personal computers with modems and/or radiotelephone capabilities, portable computers with modems and/or radiotelephone capabilities, handheld computers with modems and/or radiotelephone capabilities, personal digital assistants (PDAs) with modems and/or radiotelephone capabilities, pagers, cellular telephones, web phones, web-enabled radiotelephones, and other mobile/wireless devices.

Referring now to FIG. 4, operations for integrating advertising within Web content requested by users according to embodiments of the present invention are illustrated. Upon receiving a request from a user for Web content via a telephone device, a Web server 44 retrieves an advertisement from an advertisement server 46 (Block 100). The Web content and advertisement have a text-based format (e.g., VXML) and the advertisement may be configured to be interactive when converted to an audio format with the Web content. The Web server 44 inserts the retrieved advertisement within the user requested Web content (i.e., within one or more VXML documents representative of the Web content) (Block 200), and forwards the user requested Web content and advertisement in the VXML document(s) to a text-to-speech transcoder 42 for conversion to an audio format (Block 300). The text-to-speech transcoder 42 converts the Web content and advertisement from a text-based format to an audio format (Block 400) and serves the Web content and advertisement in the audio format (i.e., as an audio stream) to the user client device via a telephone link established with the user client device (Block 500).

If the advertisement is configured to be interactive, the text-to-speech transcoder 42 notifies the advertisement server 46 of user interaction with the advertisement (Block 600). For example, the user's interaction with the advertisement (i.e., pressing a key on a keypad during the advertisement and/or speaking one or more recognizable words and/or phrases) is recorded by the advertisement server. Moreover, information such as, but not limited to, an identification of the requesting client device, user, and time and date information, etc., may be recorded by the advertisement server for use in measuring effectiveness of a particular advertising campaign. Information associated with providing a user with additional information associated with an advertisement may also be stored.

According to embodiments of the present invention, the text-to-speech transcoder 42 may retrieve additional information associated with the advertisement in response to user interaction with an interactive advertisement (Block 700) and deliver the additional information to the user client device in an audio format (Block 800). For example, a text-to-speech transcoder 42 may be configured to recognize key words spoken by the user during delivery of an advertisement (Block 710, FIG. 5). In response to recognizing one or more key words spoken by the user, the text-to-speech transcoder 42 may be configured to redirect the user client device to additional Web content associated with the advertisement (e.g., to another Web site) (Block 720, FIG. 5). According to embodiments of the present invention, additional information may retrieved from (or via) the advertisement server 46 and delivered to the user client device.

Still referring to FIG. 4, the advertisement server 46 may be configured to store information associated with serving an advertisement to a user (Block 900). In addition, the advertisement server 46 may store information associated with user interaction with an advertisement. According to additional embodiments of the present invention, the advertisement server 46 may be configured to determine if and/or how many times a user listens to an advertisement (Block 1100).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

We claim:

1. A computer system for transmitting aggregated web content from at least two web servers to a mobile telecommunication device in audio format, comprising:
   at least two web servers with web content, the web servers executing the steps of:
   receiving a user request for audio web content from a mobile telecommunications device;
   selecting a first web content in text format from a first of the at least two web servers in response to the user request;
   determining an aggregate pre-determined time and length for a plurality of second web content in an audio output format, wherein said plurality of second web content is capable of being incorporated with the selected first web content;
   selecting the plurality of second web content in text format from a second of the at least two web servers, wherein the plurality of second web content is related to content within the first web content, and wherein the selection of the plurality of second web content is based on the determined aggregate pre-determined time and length;
   identifying at least one initial keyword related to the selected second web content;
   identifying a plurality of related keywords related to the identified at least one initial keyword;
   converting the selected first web content, the identified at least one keyword, the selected plurality of second web content and the identified plurality of related keywords to an audio format; and
   transmitting the converted web content to the mobile telecommunications device via a telecommunications link, wherein the converted web content in audio format is interactive in response to input of the selected at least one initial keyword or at least one of the plurality of related keywords by the user.

2. The computer system of claim 1, wherein the converted web content format comprises a voice extensible markup language (VXML) format.

3. The computer system of claim 1, wherein converting the selected first web content in text format comprises the use of at least one text-to-speech transcoder.

4. The computer system of claim 1, wherein the selected plurality of second web content in text format is comprised of one or more text advertisements.

5. A computer implemented method for transmitting compiled web content from at least two web servers to a mobile telecommunication device in audio format, the method comprising:
   receiving a user request for audio web content from a mobile telecommunications device;
   selecting a first web content in text format from a first of the at least two web servers in response to the user request;
   determining an aggregate pre-determined time and length for a plurality of second web content in an audio output format, wherein said plurality of second web content is capable of being incorporated with the selected first web content;
   selecting the plurality of second web content in text format from a second of the at least two web servers, wherein the plurality of second web content is related to content within the first web content, and wherein the selection of the plurality of second web content is based on the determined aggregate pre-determined time and length;
   identifying at least one initial keyword related to the selected second web content;
   identifying a plurality of related keywords related to the identified at least one initial keyword;
   converting the selected first web content, the identified at least one initial keyword, the selected plurality of second web content and the identified plurality of related keywords to an audio format;
   and
   transmitting the converted web content in audio format to the mobile telecommunications device via a telecommunications link, wherein the converted web content in audio format is interactive in response to input of the selected at least one initial keyword or at least one of the plurality of related keywords by the user.

6. The computer implemented method of claim 5, wherein the converted web content format comprises a voice extensible markup language (VXML) format.

7. The computer implemented method of claim 5, wherein converting selected first web content in text format comprises the use of at least one text-to-speech transcoder.

8. The computer implemented method of claim 5, wherein the plurality of second web content in text format is comprised of one or more text advertisements.

\* \* \* \* \*